United States Patent [19]

Swasey et al.

[11] Patent Number: 4,626,111
[45] Date of Patent: Dec. 2, 1986

[54] SELF-COMPENSATING ANTI-FRICTION BEARING CLEARANCE DEVICE

[75] Inventors: Archie N. Swasey, Oxford; William J. Winter, Trumbull, both of Conn.

[73] Assignee: Farrel Corporation, Ansonia, Conn.

[21] Appl. No.: 758,733

[22] Filed: Jul. 25, 1985

[51] Int. Cl.⁴ ............................................. F16C 27/00
[52] U.S. Cl. ..................................... 384/99; 384/557; 384/563
[58] Field of Search ................. 384/99, 556, 557, 563, 384/571

[56] References Cited

U.S. PATENT DOCUMENTS 3,304,139 2/1967 Toth et al. ........................... 384/556
3,558,199 1/1971 Raiser et al. ........................ 384/556
4,400,098 8/1983 Lacey et al. ............................ 384/99

Primary Examiner—Lenard A. Footland
Attorney, Agent, or Firm—Parmelee, Bollinger & Bramblett

[57] ABSTRACT

A device for automatically adjusting the clearances in a roller bearing due to thermal expansion, constituting a tapered roller bearing having a dual track oppositely tapered inner race and a pair of single track tapered outer races, each outer race being in communication with a pair of coaxial, hydraulically loaded annular pistons, each of which translates in annular piston cylinders, supplied with hydraulic fluid. The hydraulic pressure of the fluid is maintained through an accumulator at a preselectable constant pressure to permit the outer races to translate axially, against the annular piston, as the inner race expands radially due to thermal expansion. Upon thermal contraction, the pressure forces the annular pistons axially toward the outer races, which, due to the taper of the races and the bearing elements, reduces the clearance created due to the thermal contraction.

2 Claims, 3 Drawing Figures

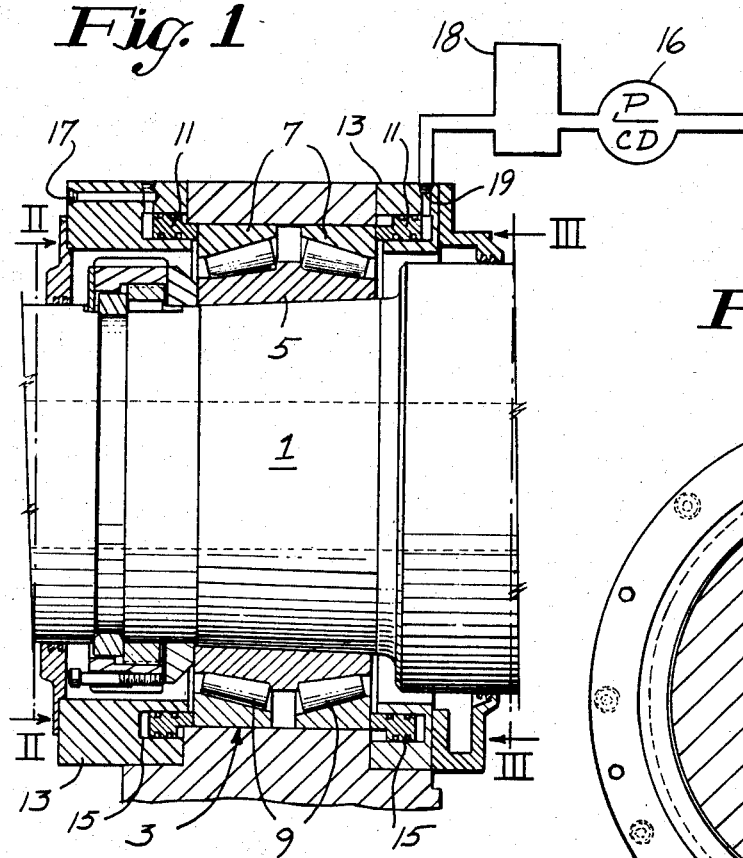
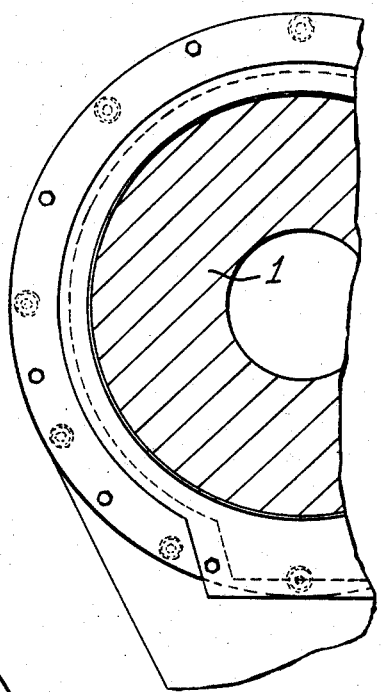
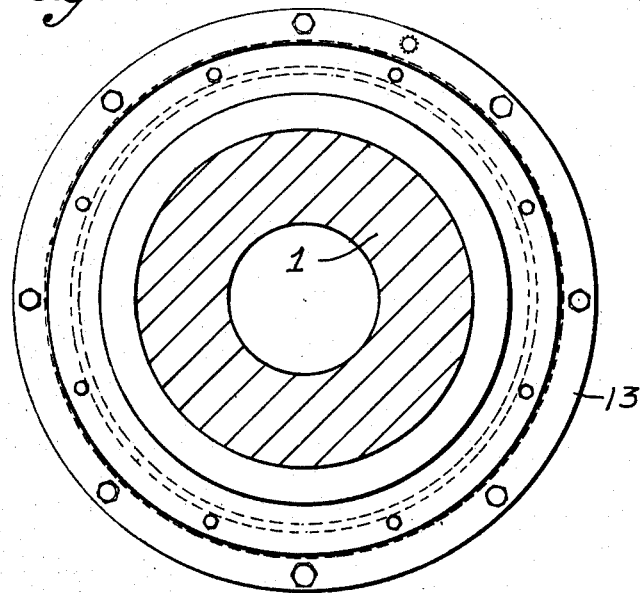

SELF-COMPENSATING ANTI-FRICTION BEARING CLEARANCE DEVICE

This invention relates generally to the field of anti-friction roller bearings, and more specifically to a method and device for automatically adjusting the internal clearance in a roller bearing to account for thermal expansion and contraction.

BACKGROUND OF THE INVENTION

Commonly, in machinery involving rotating elements, the rotating shafts are supported by anti-friction roller bearings. A common configuration is for a bearing race to be press-fitted or otherwise secured to the rotating shaft. This inner shaft race cooperates with a larger diameter race, which circumscribes the first. The two races sandwich roller bearing elements, such as bearing balls, or tapered bearing elements, between each other.

During normal operation of a machine, the machine heats up. Due to this heating, the elements of the machine expand and clearances between parts constrict. It is necessary to design the machin such that it does not bind at elevated operating temperatures as a result of this expansion. Therefore, at lower start-up temperatures, the clearances between elements of the roller bearing would be greater than at elevated operating temperatures. Thus, the rotating shaft is not constrained to the ultimate degree, and may cause excessive runout during the machine start-up. Consequently, the dimensions of the material being processed by this machine will suffer greatly by the bearing clearance deviation, resulting in the end product being off-specification. Thus, product manufactured during the start up and cool down phases of the machine is wasted. Also, if this installation were designed for a maximum elevated temperature, the clearance in the bearing, at a lower temperature, would also be objectionable, without this device.

In order to overcome this problem in the past, shims have been added to the machine set-up to set the clearance for each maximum operating temperature. Setting the shims wastes time and requires the expertise of an engineer to calculate the shim thickness required for each temperature range.

Another method has been used for adjusting the clearance between the inner and the outer bearing races. This method does not, however, provide for automatic adjustment of the race-to-race clearance during thermal expansion of the bearing during operation. In this method, a standard dual track internal collar is used in conjunction with a pair of sets of tapered rollers. The outer race is a specially formed dual track race, having an annular projection extending from one end. This annular projection forms a circumferential guide surface for a hydraulically actuated annular piston. The piston moves inside the projection. The piston pushes against the end faces of one set of tapered rollers on the end which faces away from the second set of rollers. Before the machine is started up, the piston pushes the tapered rollers to a predetermined location. Because the rollers and both the inner and outer races are tapered, moving the roller axially along the race changes the radial gap separation between the inner and outer races. This method establishes a precise pre-operation adjustment, but it does not provide for automatic adjustment to thermal expansion. Further, because the annular piston rubs against the moving rollers, it is likely that significant wear of the piston and the rollers would occur.

An additional general problem encountered is that as the parts of the roller bearing wear, a widening of clearances occurs, thus also destroying the tolerance of the product.

Thus, it is an object of our invention to provide an automatic method for adjusting the clearances within a roller bearing due to thermal variations during the operation of a device, and to changes due to wear, that does not require manually setting shims, or the expertise required to calculate shim size. It is a further object to provide such an automatically adjusting bearing device, that is inexpensive to make, uses predominantly standard parts and that does not undergo an unacceptable degree of wear.

SUMMARY OF THE INVENTION

Our invention accomplishes automatic adjustment to thermal exapansion, by providing a tapered roller bearing having, in one embodiment, a pair of hydraulically loaded collars, which maintain the outer races of a bearing assembly in close tolerances at the outset of operation, which also allow the tapered outer races to translate axially, thereby creating additional clearance to accommodate the inner race and bearing elements as they expand due to thermal increase.

Specifically, the embodiment of the invention consists of an internal dual track oppositely tapered race, two sets of tapered rollers, arranged with the narrow ends of the tapers facing away from each other, and a pair of single track outer races which capture the bearings in cooperation with the inner race. A pair of rings are provided that are arranged coaxial to the outer bearing races, and adjacent the ends of the races that face away from each other. The rings and the outside races are contiguous across a portion of their radii. The rings press upon the outer bearing races around the entire circumference of each. Each of the rings is located in an annular channel, and a hydraulic chamber communicates with the ring on the side of the ring facing away from the bearing race. Thus, the rings are annular pistons and the annular channels are annular hydraulic cylinders. A pressure regulated source communicates with the hydraulic chamber through an accumulator of either the mechanical or air pressure type.

At start-up, the hydraulic cylinders are pressurized so that the rings are forced into contact with the bearing races. As the bearing heats up, the outer races are forced radially outward. In a device according to the prior art, forcing these bearings outward would cause them to bind against the annular rings, or against an outer housing. Because the annular rings are restrained by a constant pressure source, regulated by the accumulator, rather than fixed, solid elements, instead of binding the outer races, the annular rings recede, to a degree to permit the inner race to expand, but also maintaining enough force on the race so that the race solidly locates the bearing elements and the shaft. As the bearing heats up, the annular rings move further and further out, always maintaining the appropriate contact with the bearing race. Similarly, as the bearing cools down, the pressurized fluid returns the annular rings and the bearing races to the original starting position.

It is readily seen, that, due to the pressurized preloading, the invention also automatically adjusts the system to accommodate widening of clearances due to wear.

BRIEF DESCRIPTION OF THE DRAWINGS

FIG. 1 shows a view in partial cross-section of one embodiment of our invention;

FIG. 2 is a cross-section of the embodiment shown in FIG. 1, through the lines II—II; and FIG. 3 is another cross-section of the embodiment of our invention shown in FIG. 1, along the lines III—III.

DESCRIPTION OF THE PREFERRED EMBODIMENT

Our invention may best be understood by reference to the figures of the Drawing and the discussion below. FIG. 1 shows a partial cross-section of our invention. A shaft 1 is journaled in a tapered roller bearing assembly 3. The bearing assembly is made up of an inner dual track oppositely tapered race 5 and a split pair of standard outer races 7. Two sets of standard tapered rollers 9 are sandwiched between the inner and outer races. The two outer races 7 are hydraulically pre-loaded by hydraulically pressurized rings 11. The rings are retained in ring retainers 13 each provided with annular channels 15 formed in the retainer wall structure and in which the rings travel. The channels 15 communicate with a hydraulic pressure source 16 shown schematically through pressure ports 17 and 19. The pressure source maintains a constant pressure in the annular channel by means of the accumulator 18 also shown schematically.

Before start-up, pressure is applied to the pressure ports, urging the rings 11 into contact with the outer split races (cups) 7. As the roll journal heats up, the inner race 5 expands radially due to thermal expansion. The expansion causes the rollers 9 to be used against the outer races 7. Because both the roller and the outer races are tapered, a component of the force transmitted from the roller to the outer race is expressed as a motion of the outer race in the axial direction, with respect to the shaft 1. The race is able to move in the axial direction, because the retaining rings 11 impinge upon the races, but only with a force corresponding to the preselectable pressure. This pressure may be set and maintained, so that under normal operating conditions, the force applied by the race 7 to the rings 11 due to the thermal expansion is greater than the force due to pressure. Consequently, as the thermal expansion forces the outer races axially outward, the outer race forces the retaining ring 11 axially outward in the retaining recess 15. The accumulator 18 may be easily selected by one skilled in the art. Both mechanical and pneumatic types are suitable. The accumulator maintains the constant pressure by accommodating the small displacement caused by the motion of the annular rings, which motion would not be accommodated by incompressible hydraulic fluid.

When the roll journal cools, the reverse action occurs, with the pressureized source pushing the rings against the races as the races reced, and then pushing the races closer together to reduce the clearance that normally arises as the bearing is cooled and the diameter decreases the thermal contraction.

This system also automatically accommodates widening of clearances due to wear. Prior to operation of the device, actuation of the pressure source urges the rings 11 axially toward each other. Due to the taper of the rollers and the races, this snugs up the races in the radial direction. This feature will promote more even wear, further enchancing the life of the bearing.

The normal operating pressure for this device would rang from 50 to 500 psi depending on size and loading on the bearing.

Thus, it can be seen, that the above described system is wholly automatic. Once the proper pressure is chosen, and maintained throughout, the system can accommodate a wide range of temperature variation. It can also accommodate and minimize the effect of wear. Further, with the exception of the annular retaining rings, and pressure delivery components, the entire roller bearing assembly is made of standard parts. This greatly reduces the cost, and thereby enhances the attractiveness of this device.

The above discussion should be taken as illustrative, and should not be considered to be limiting in any sense. Variations on the above described invention will be evident to those skilled in the art.

Having thus described our invention, we claim:

1. An automatically adjusting roller bearing assembly for supporting a rotating shaft, said roller bearing assembly comprising:
   (a) a unitary dual track oppositely tapered inner bearing race;
   (b) a pair of sets of roller elements, disposed around the circumference of each track of said inner bearing race;
   (c) a split pair of tapered outer bearing races, each arranged so as to capture one set of roller elements between said inner bearing race and said respective outer bearing race, said outer bearing races being supported against axial movement one toward the other solely by said roller elements; and
   (d) axially traversable means for applying and maintaining a preselectable force applied axially to each race of said pair of outer races in the direction toward the other of said outer races.

2. A roller bearing assembly designed to automatically accommodate for clearance changes due to thermal variations and wear, said roller bearing assembly comprising:
   (a) a unitary dual track oppositely tapered inner bearing race;
   (b) a pair of sets of tapered, cylindrical roller elements, disposed around the circumference of each track of said inner bearing race;
   (c) a pair of split tapered outer bearing races, each arranged so as to capture one set of roller elements between said inner bearing race and said respective outer bearing race, said outer bearing races being supported against axial movement one toward the other solely by said roller elements;
   (d) with respect to at least one of said outer races;
      (i) an axially traversable ring for applying and maintaining a preselectable force applied axially to said at least one tapered outer race in the direction toward the other of said outer races, said ring being coaxial with said race and axially adjacent said race, of a radial thickness and radius such that said ring and said outer race are contiguous across a portion of the radial thickness of each; and
      (ii) wall structure adjacent said one tapered outer race forming an annular channel, coaxial with said ring; in which said ring is located in fluid sealing engagement; and (e) hydraulic means for maintaining said force prior to and during the operation of said bearing assembly including an adjustable fluid pressure source and an accumulator in fluid communication with said annular channel;
wherein said pressure source is capable of producing a constant pressure in said annular channel, which constant pressure acts through said fluid upon said ring.

* * * * *